United States Patent

[11] 3,561,629

| [72] | Inventor | Howard M. Turner |
| | | Oak Forest, Ill. |
| [21] | Appl. No. | 799,712 |
| [22] | Filed | Feb. 17, 1969 |
| [45] | Patented | Feb. 9, 1971 |
| [73] | Assignee | Continental Can Company, Inc. |
| | | New York, N.Y. |
| | | a corporation of New York |
| | | Continuation-in-part of application Ser. No. 648,356, June 23, 1967, Patent No. 3,457,337, which is a division of application Ser. No. 356,411, Apr. 1, 1964, abandoned. |

[54] LAMINATED OR COATED BLOW MOLDED CONTAINERS
9 Claims, 8 Drawing Figs.

| [52] | U.S. Cl. | 215/1, 220/63 |
| [51] | Int. Cl. | B65d 23/08 |
| [50] | Field of Search | 215/1, 1.5; 220/63; 264/94, 98 |

[56] References Cited
UNITED STATES PATENTS

| 2,860,801 | 11/1958 | Nielsen | 215/1.5 |
| 3,023,461 | 3/1962 | Sherman | 264/98 |
| 3,113,831 | 12/1963 | Coale | 215/1UX |
| 3,168,207 | 2/1965 | Noland et al. | 215/1.5 |
| 3,221,954 | 12/1965 | Lux | 215/1.5X |
| 3,223,761 | 12/1965 | Raley | 264/95 |
| 3,359,602 | 12/1967 | Bailey | 264/94X |
| 3,457,337 | 7/1969 | Turner | 264/173 |

FOREIGN PATENTS

| 1,281,291 | 11/1960 | France | 215/1.5 |

*Primary Examiner*—Raphael H. Schwartz
*Attorney*—Diller, Brown, Ramik and Hold

ABSTRACT: This invention relates to novel blow molded laminated plastic containers formed by extruding a composite plastic tube and expanding the same to a desired configuration within a blow mold cavity, each container including a body wall terminating at one end in a neck and at an opposite end in a bottom wall, a line of flash traversing the bottom wall, the line of flash including a pinched-off portion, the body wall being composed of a plurality of laminates, and the pinched-off portion being composed of at least one less wall than the number of laminates forming the body wall.

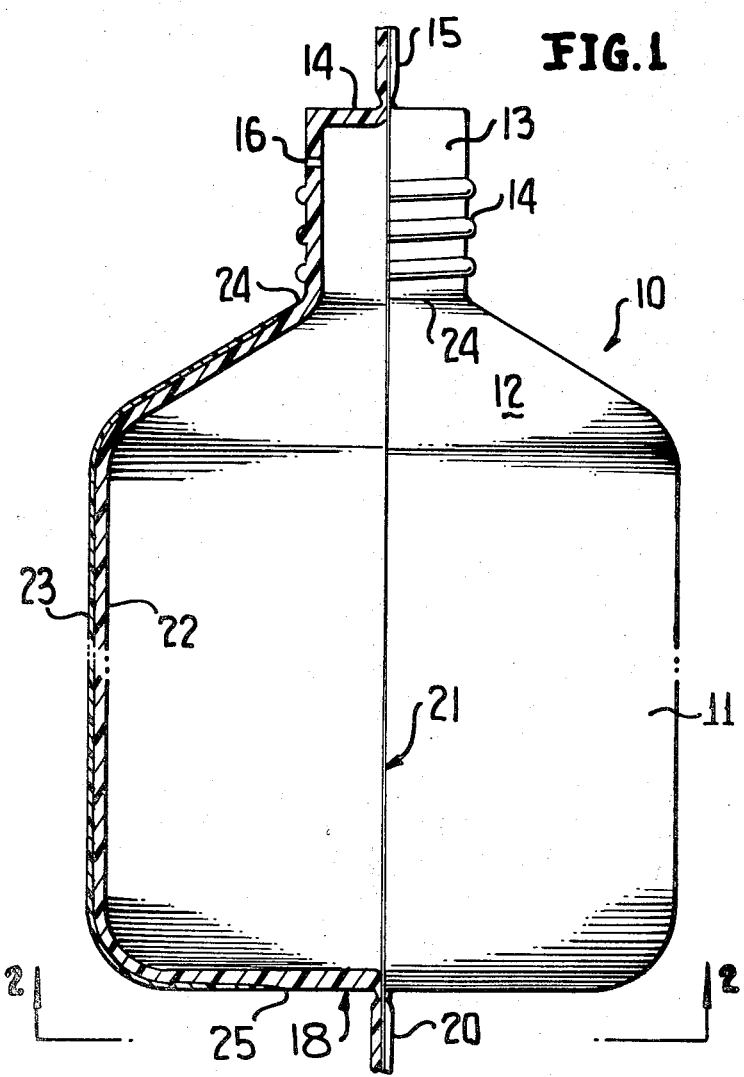
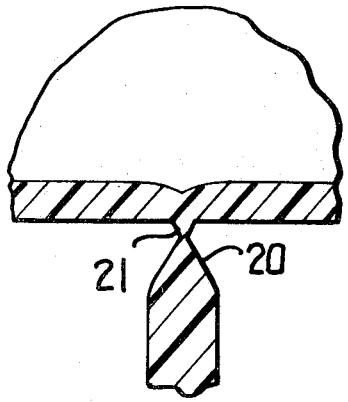
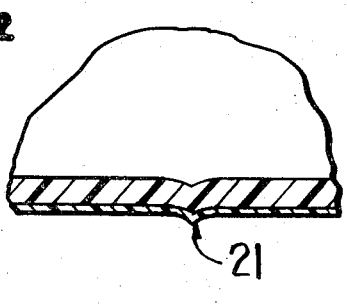
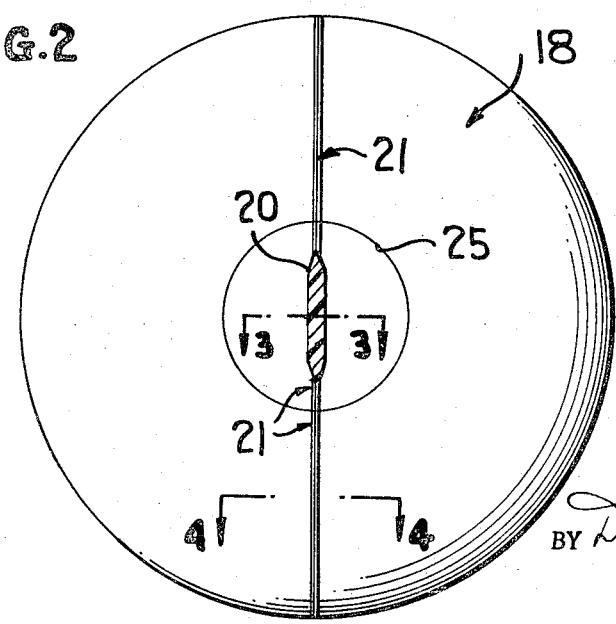

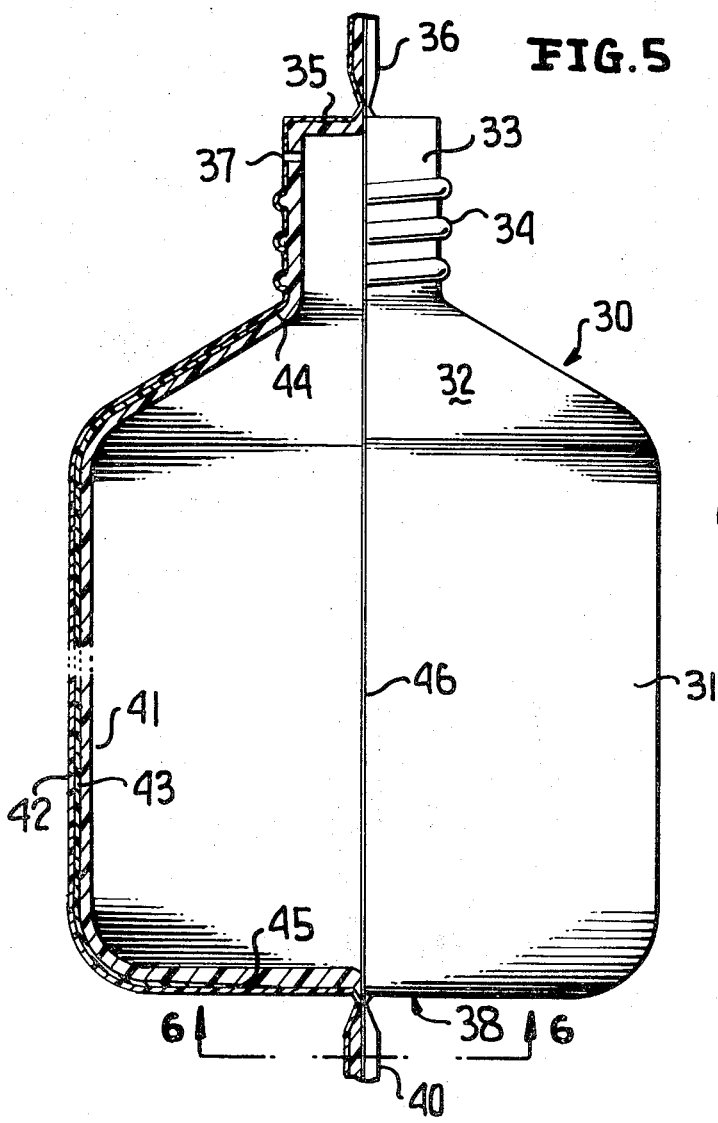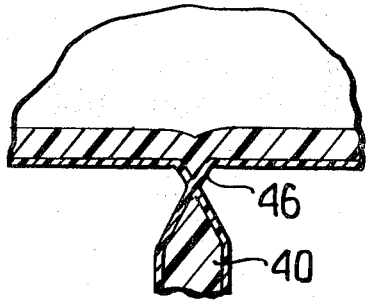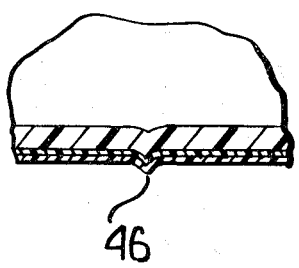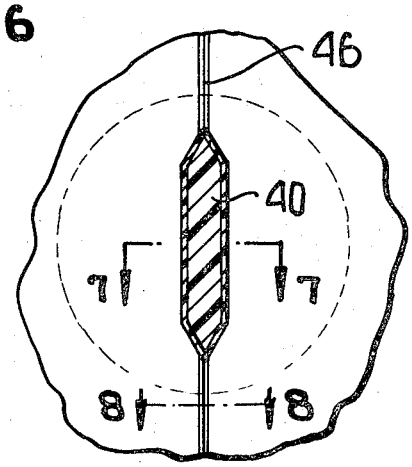

LAMINATED OR COATED BLOW MOLDED CONTAINERS

This application is a continuation-in-part application of my copending, commonly assigned application entitled Method Of Producing Coated Containers filed June 23, 1967, Ser. No. 648,356, now U.S. Pat. No. 3,457,337, issued July 22, 1969 which application is a divisional application of now abandoned application Ser. No. 356,411, filed Apr. 1, 1964 and entitled Method And Apparatus For Producing Coated Containers.

Heretofore plastic articles and particularly plastic containers have been exteriorly and/or interiorly coated by conventional methods, such as dip coating or spray coating. The judicious application of such coatings improves the functionality of the containers insofar as the ability of such coated containers to hold certain products. For example, a polyethylene container dip coated with a 0.3—0.4 mil thick coating of vinylidene chloride (Saran) exhibits a fivefold reduction in oxygen permeation over an uncoated container. This permits the packaging of products, such as salad oils and other products similarly sensitive to oxygen permeation, into containers so coated. Recently it has become common to form multiply containers by extruding a plural-laminate tube and conventionally pneumatically expanding the tube to a desired container configuration. This process is somewhat more advantageous than dip coating or spray coating because additional equipment, labor, overspraying or overcoating, etc., is unnecessary. However, in all these methods of production a prime disadvantage is the difficulty of maintaining high product quality on a production basis because of the inability to achieve adhesion between the "base-containers" and the coatings applied thereto, whether by spraying, dipping, multiple-ply extruding, etc. As a result the base container and its coatings tend to delaminate which is particularly true if the outermost ply of the container is relatively thin and includes closure securing means, such as lugs, screw threads, etc. In the latter example a closure which is inadvertently or accidentally overtightened upon conventionally produced laminated containers tends to tear the outer ply from the next succeeding ply thereby rendering such containers wholly inoperative.

More important in the manufacture of such conventional multiply containers is the fact that the number of laminates is uniform which increases the tendency for the container to delaminate, particularly across the pinched-off portion and more particularly if various ones of the laminates are not readily cross-fusible to each other. However, in accordance with this invention the containers are formed by pinching off the laminated parison across either only a single laminate at axially opposite ends of the parison or across less than the number of total laminates which are preferably formed of identical plastic material of a cross-fusible nature. The complete sandwiching of the medial laminate between inner and outer laminates of identical material virtually precludes delamination of the container during its lifetime and otherwise normally weakened pinched-off portions are strengthened both in the neck area of the finally formed container and in the bottom wall thereof.

Therefore, in keeping with the foregoing it is a primary object of this invention to provide a novel blow molded laminated plastic container which includes a body wall terminating at one end in a neck and at an opposite end in a bottom wall, a line of flash traversing the bottom wall, the line of flash including a pinched-off portion, the body wall being composed of a plurality of laminates, and the pinched-off portion being composed of at least one less wall than the number of total laminates forming the body wall.

A further object of this invention is to provide a novel blow molded laminated plastic container of the type heretofore set forth wherein the neck is closed by a wall which includes a transverse line of flash having a pinched-off portion, and the last-mentioned pinched-off portion is composed of at least one less wall than the number of laminates forming the body wall.

Yet another object of this invention is to provide novel blow molded laminated plastic containers of the type just described wherein the pinched-off portions are composed of either a single laminate or two or more laminates which are constructed from identical plastic material or plastic material which is readily cross-fusible to itself and does not tend to delaminate under normal conditions of storage, packaging, transportation, etc.

With the above noted objects in view that will hereinafter appear, the nature of the invention will be more clearly understood by reference to the following detailed description, the appended claims and the several views illustrated in the accompanying drawings.

In the drawings:

FIG. 1 is a side elevational view partially in cross section of a novel plastic container of this invention, and illustrates upper and lower pinched-off portions and an exterior laminate which terminates short of both pinched-off portions.

FIG. 2 is a bottom view of the container of FIG. 1 taken generally along line 2-2 of FIG. 1, and more clearly illustrates the manner in which the edge of the exterior laminate terminates short of and in encircling relationship to the lower pinched-off portion whereby the latter is formed only from the material of an inner laminate.

FIG. 3 is a very highly enlarged fragmentary sectional view taken generally along line 3-3 of FIG. 2, and illustrates the pinched-off portion composed of but a single laminate.

FIG. 4 is a highly enlarged fragmentary sectional view taken generally along line 4-4 of FIG. 2, and illustrates a two-ply line of flash at opposite diametrical ends of the pinched-off portion.

FIG. 5 is a side elevational view partially in cross section of another plastic container constructed in accordance with this invention, and illustrates a medial laminate sandwiched between inner and outer laminates and terminating short of upper and lower pinched-off portions.

FIG. 6 is a fragmentary sectional view taken generally along line 6-6 of FIG. 5, and illustrates the two-ply construction of the lower pinched-off portion wherein the plastic material of the inner and outer laminates is either identical or is highly cross-fusible to each other.

FIG. 7 is a highly enlarged fragmentary sectional view taken generally along the line 7-7 of FIG. 6, and illustrates the manner in which the pinched-off portion is formed of two of the three laminates.

FIG. 8 is a fragmentary enlarged sectional view taken generally along line 8-8 of FIG. 6, and illustrates the manner in which diametrically opposite portions of a line of flash are formed of all three of the laminates.

Reference is first made to FIG. 1 of the drawings which discloses a novel blow molded laminated plastic container which is generally designated by the reference numeral 10. The container 10 includes a body 11 of a generally cylindrical configuration, although the particular shape of the container body 11 may be varied as found desirable for esthetic, marketing or packaging reasons. The body 11 includes an upper annular shoulder 12 which merges with a neck 13 having a plurality of screw threads 14 or similar closure securing means, such as lugs, for the purpose of securing a closure (not shown) to the container in a conventional manner. The neck 13 terminates in a closure wall or an end wall 14 from which is upwardly directed a pinched-off portion 15. The neck 13 also includes a punctured hole or opening 16 which is formed by the introduction of a blow needle into the parison to form the container 10 in the manner fully set forth in the parent disclosure heretofore noted.

The lower end of the container 10 is closed by a bottom wall, generally designated by the reference numeral 18. The bottom wall 18 likewise includes a pinched-off portion 20 which in size and shape corresponds to the pinched-off portion 15. The pinched-off portion 20, as well as the pinched-off portion 15, is disposed in a longitudinal plane taken through the axis of the container 10 and form portions of a line of flash 21 which extends from both sides of the pinched-off portion 20 across the bottom wall 18, upwardly along the body 11, the shoulder 12 and the neck 13, and across the end wall 14 where at the line of flash merges with the pinched-off portion 15.

As is best illustrated in FIG. 1 of the drawings, the container 10 is formed of two plies or laminates 22, 23 with the latter terminating at edges 24, 25 which are generally circular in outline, as is best illustrated by the edge 25 in FIG. 2. It is to be particularly noted that the edge 25 terminates short of and encircles the pinched-off portion 20, as does the edge 24 terminate short of and encircle the pinched-off portion 15. Thus, the pinched-off portions 15, 20 are formed entirely from the material of the laminate 22. In other words, upon the closing of the split molds (not shown) in the manner described in the latter-noted disclosures the laminated tube will readily cross-fuse to itself at the pinched-off portions 15, 20 because of the cross-fusible nature of the material forming the laminate 22. The lamination of the container 10 is similarly precluded because of the absence of multiply portions in the area of the neck 13 which would tend to delaminate upon the forceful application of a closure upon the lugs or similar closure securing means 14. The gradual tapering configuration of the laminate 23 at the edge portions 24, 25 respectively upwardly toward the neck 13 and inwardly toward the axis of the bottom wall 18 also virtually preclude delamination as might occur if the laminate 23 were abruptly terminated during the extrusion thereof prior to the blow molding of the container.

In the preferred embodiment of the invention the laminate 22 of the container 10 is preferably composed of polyethylene which facilitates the pinching-off and welding of the material heretofore noted and prevents delamination upon the over-tightening of a closure applied to the neck 13 upon, of course, the trimming thereof beneath the blow hole 16. Polystyrene or a similar base polymer may constitute the material of the laminate 22. The exterior laminate 23 may be one of a variety of thermoplastic polymers, such as polyvinylchloride, expanded polystyrene, nylon, polyesterterepthalate, polyvinyldichloride, chloronated polyethylene, vinylidene chloride, etc.

Reference is now made to FIGS. 5 through 8 of the drawings which illustrate another container which is generally designated by the reference numeral 30 and includes a container body 31 having an upwardly and inwardly sloping annular shoulder 32 which terminates at a neck 33 provided with screw threads or similar closure fastening means. The neck 33 terminates in an end or closure wall 35 from which upwardly projects a pinched-off portion 36. A blow needle hole 37 is formed in the neck 33 just above the screw threads 34.

A lower end portion of the container body 31 is closed by a bottom wall 38 from which downwardly depends another pinched-off portion 40 which corresponds in size and shape to the pinched-off portion 36.

As opposed to the container 10 of FIGS. 1 through 4 which is composed of two laminates, the container 30 is formed of three laminates, namely, an inner or base laminate 41, an outer laminate 42 and an intermediate laminate 43 which is sandwiched between the laminates 41 and 42. The intermediate laminate 43 terminates at an upper edge 44 which is short of and encircles the neck 33 and the pinched-off portion 36 thereof, while the lower end of the intermediate laminate 43 likewise terminates in a generally circular edge 45 which is short of and encircles the pinched-off portion 40. Thus, as is best illustrated in FIG. 7 the pinched-off portions 36, 40 are formed of the laminates 41, 42, excluding the intermediate laminate 43, while a line of flash 46 extending between and partially defining the pinched-off portions is formed of all three laminates 41 through 43.

The plastic material forming the laminate 41 is again preferably a base polymer, such as polyethylene or polystyrene, and for the purpose of this description it will be assumed that the laminate 41 is polyethylene. The material of the intermediate laminate 43 is one of a variety of thermoplastic polymers, such as polystyrene, polyvinylchloride, expanded polystyrene, nylon, polyesterterepthalate, polyvinyldichloride, chloronated polyethylene vinylidene chloride, etc. For the purpose of this description, it will be hereinafter assumed that the laminate 43 is vinylidene chloride (Saran). The plastic material forming the laminate 42 may be identical to the plastic material of the laminate 41 or the laminate 43 depending, of course, upon the cross-fusibility of particularly the inner and outer laminates 41, 42, respectively. For example, if the laminate 41 is polyethylene it will be assumed that the outer laminate 42 is likewise polyethylene. Thus, upon the pinching-off across the polyethylene laminates 41, 42 the pinched-off portions 36, 40 are readily cross-fused and sealed in a manner which precludes delamination upon the subsequent packaging, storage and use of the container 30.

After the container 30 has been suitably trimmed beneath the blow hole 37 a desired product can be packaged through the mount (not shown) of the container neck 33 in a conventional manner, after which the container is closed by securing a conventional closure (not shown) thereto. Due to the particular manner of forming the container 30 just described it should be noted that the neck 33 is constructed as a two-ply laminate formed of the inner laminate 41 and the outer laminate 42 of the same material. Since the material of the laminates 41, 42 is identical or if not identical has excellent adhesion characteristics, delamination of the container is virtually precluded and product protection and/or container rigidity is retained because of the major three-ply construction of the container and the total sandwiching of the intermediate ply 43 between the inner and outer laminates. The latter factor is highly advantageous in such cases wherein the intermediate laminate 43 is not readily fusible with either the inner or outer laminates and would otherwise tend to delaminate unless totally encased between inner and outer laminates, as in accordance with this invention. Furthermore, though the neck 33 is formed of two laminates both are polyethylene and the application to or removal of a closure from the neck 33 cannot delaminate this construction.

While preferred forms and arrangements of parts have been shown in illustrating the invention, it is to be clearly understood that various changes in details and arrangement of parts may be made without departing from the spirit and scope of the invention.

I claim:

1. A blow molded laminated plastic container comprising a body wall terminating at one end in a neck and at an opposite end in a bottom wall, a line of flash traversing said bottom wall, said line of flash including a pinched-off portion, said body wall being composed of a plurality of laminates, and said pinched-off portion being composed of at least one less wall than the number of laminates forming said body wall.

2. The blow molded laminated plastic container as defined in claim 1 wherein said neck is closed by a wall which includes a transverse line of flash having a pinched-off portion, and said last-mentioned pinched-off portion is composed of at least one less wall than the number of laminates forming said body wall.

3. The blow molded laminated plastic container as defined in claim 1 wherein said pinched-off portion is composed of but a single laminate.

4. The blow molded laminated plastic container as defined in claim 1 wherein said plurality of laminates include an inner ply and an outer ply, and one of said plies terminates in said bottom wall short of said line of flash and in encircling relationship to said pinched-off portion.

5. The blow molded laminated plastic container as defined in claim 1 including an annular shoulder between said neck and said body wall, said plurality of laminates include an inner ply and an outer ply, and one of said plies terminates in said annular shoulder and in encircling relationship to said neck.

6. The blow molded laminated plastic container as defined in claim 1 wherein said pinched-off portion is composed of at least two laminates which are readily cross-fusible to each other, and said plurality of body wall laminates include a laminate sandwiched between said cross-fusible laminates.

7. The blow molded laminated plastic container as defined in claim 2 wherein said plurality of laminates include an inner ply and an outer ply, and one of said plies terminates at axially opposite ends short of said lines of flash and in encircling relationship to said pinched-off portions.

8. The blow molded laminated plastic container as defined in claim 2 including an annular shoulder between said neck and said body wall, said plurality of laminates include inner, intermediate and outer plies, said inner and outer walls being cross-fused directly to each other at said pinched-off portions, and said intermediate ply terminates short of and in encircling relationship to said pinched-off portions.

9. The blow molded laminated plastic container as defined in claim 8 wherein said intermediate ply terminates at axially opposite ends thereof in said annular shoulder and said bottom wall.